(No Model.) 2 Sheets—Sheet 1.

P. G. BIBLE.
STALK STRIPPER.

No. 450,445. Patented Apr. 14, 1891.

Witnesses
F. V. Cornwall
Chas. P. Calvert

Inventor
Philip G. Bible
By
E. H. Gelston
His Attorney (No Model.) 2 Sheets—Sheet 2.

P. G. BIBLE.
STALK STRIPPER.

No. 450,445. Patented Apr. 14, 1891.

Witnesses
F. R. Cornwall,
L. S. Bacon

Inventor
Philip G. Bible
By E. H. Gelston,
Atty.

UNITED STATES PATENT OFFICE.

PHILIP G. BIBLE, OF SMITH, GEORGIA.

STALK-STRIPPER.

SPECIFICATION forming part of Letters Patent No. 450,445, dated April 14, 1891.

Application filed August 9, 1890. Serial No. 361,514. (No model.)

*To all whom it may concern:*

Be it known that I, PHILIP G. BIBLE, a citizen of the United States, residing at Smith, in the county of Dade and State of Georgia, have invented certain new and useful Improvements in Stalk-Strippers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a new and useful improvement in stalk-strippers; and it consists in the construction and arrangement of parts more fully hereinafter described and claimed.

The object of my invention is to provide a simple, cheap, and effective device for stripping the blades from cornstalks, sugar-cane, &c., and also to break or tear off the tassels from the top thereof, leaving a clear and unbroken stalk. This object I attain by the construction illustrated in the accompanying drawings, forming a part of this specification, in which—

Figure 1:
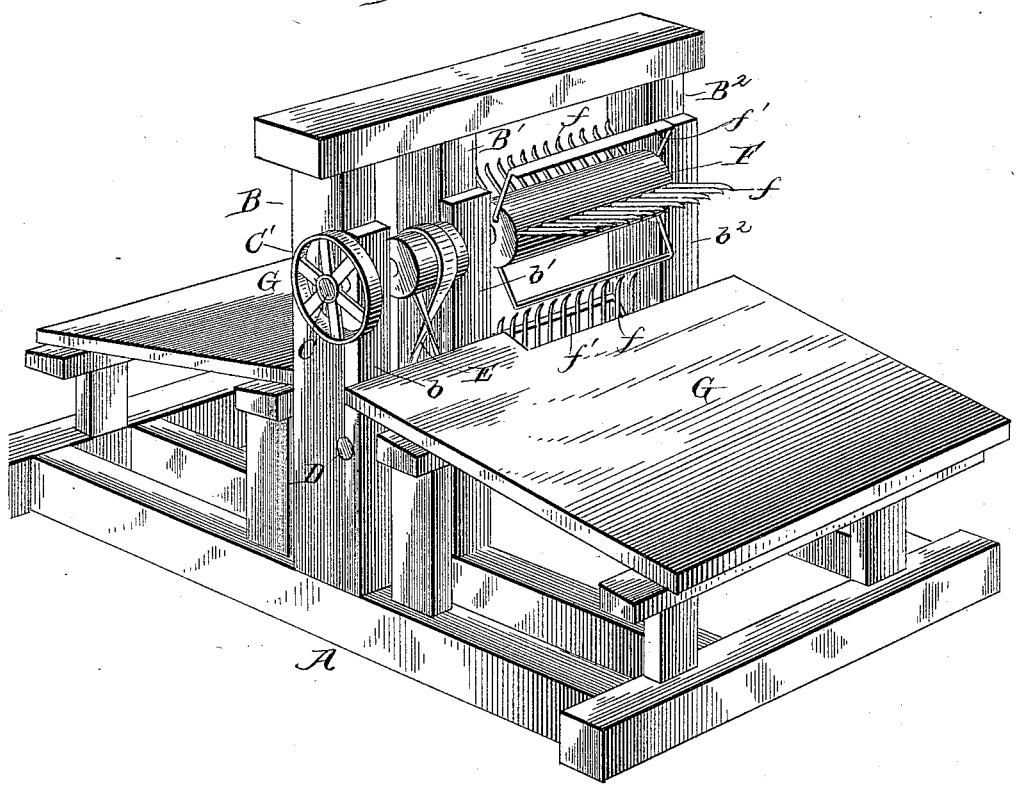
Figure 2:
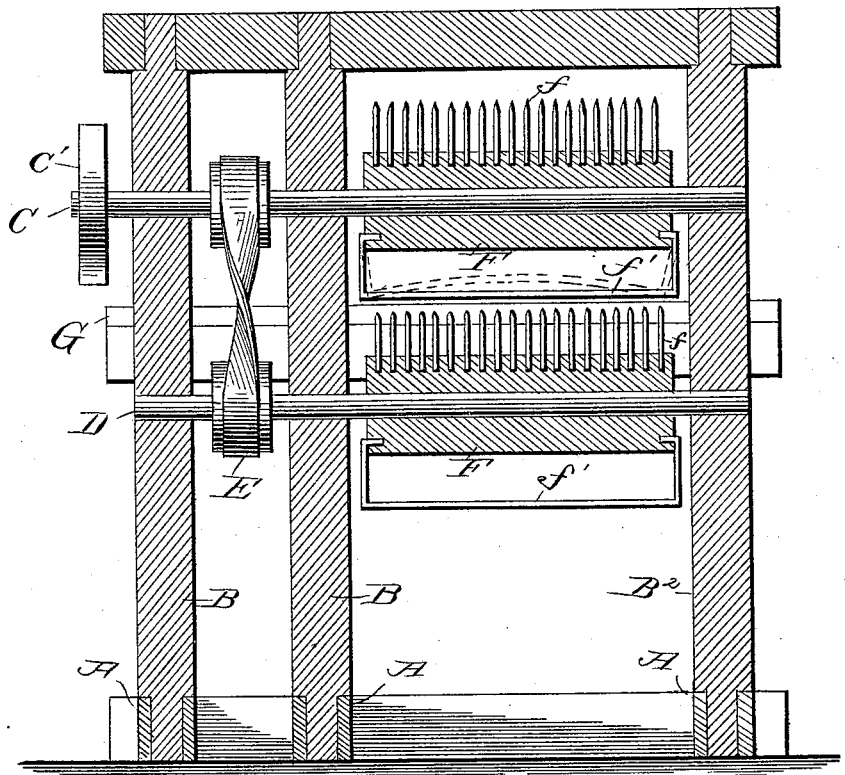

Figure 1 is a perspective view of my device, and Fig. 2 is a transverse vertical cross-section of the same, taken through the cylinders.

Referring to the drawings by letters of reference, A indicates the base, preferably constructed of three parallel bars connected at their ends by cross-pieces. Extending up from these bars are standards B, B', and B², having side cap-bearings $b$, $b'$, and $b^2$ thereon. Between said cap-plates and standards are secured two horizontal shafts C and D. On the outer end of the shaft C is a pulley C', to which motion may be imparted in any suitable manner.

Secured between the standards B and B' on the shafts C and D are two pulley-wheels, having a belt E thereon, crossed so as to impart motion to the cylinders F in opposite directions. These cylinders F are secured on the shafts between the standards B' and B², and have secured thereon flexible teeth and knives $f$ and $f'$, respectively, placed alternately around said cylinders. The teeth are preferably curved near their outer ends, as shown, to more firmly grip and tear the leaves from the stalks.

G represents the tables placed on each side of the strippers, and are inclined to permit the operator to advantageously feed the stalks and give a greater angle to the knives and teeth.

The operation may be described as follows: The stalks are fed in between the cylinders, butt-end first, the teeth tearing the leaves from the stalks, and the knives being flexible will not penetrate the tough or large part of the stalk, but will bend, as shown in dotted lines, Fig. 2, and until the tassels or tender ends are reached they simply act to tear the leaves off; but as soon as this portion of the stalk is reached it is immediately severed by the blades.

By this construction it will be seen that the stalks may be fed and stripped entirely of any superfluous material which is foreign to the manufacture of sorghum.

I do not desire to limit myself to the specific construction shown in the drawings, for it is obvious that gear-wheels may be used instead of pulleys and a band; also, it may be desirable to change the position of the upper cylinder, so that the stalk will not be struck at the same time, which may be injurious to the same, as in the case of tearing or breaking sugar-cane, which makes it much harder to handle.

Having thus described my invention, what I claim, and desire to secure by Letters Patent, is—

1. In a stalk-stripping machine, the combination, with the base and standards, of tables on each side of the standards, horizontal shafts mounted in the standards respectively above and below the level of the tables, means for oppositely revolving said shafts, and cylinders mounted on the shafts, having alternately-longitudinal radiating knives and radial teeth, substantially as described.

2. In a stalk-stripping machine, the combination, with the base, table, and standards, of horizontal shafts mounted in the standards, cylinders rigidly mounted on said shafts, longitudinal flexible knives and radial teeth on the cylinders, and means for oppositely revolving the cylinders, substantially as described.

In testimony whereof I affix my signature in presence of two witnesses.

PHILIP G. BIBLE.

Witnesses:
JAMES W. BLEVINS,
N. W. COLE.